(12) United States Patent
Gourlay

(10) Patent No.: US 8,264,622 B2
(45) Date of Patent: Sep. 11, 2012

(54) LIGHT GUIDES

(75) Inventor: James Gourlay, Livingston (GB)

(73) Assignee: ITI Scotland Limited, Glasgow (GB)

( * ) Notice: Subject to any disclaimer, the term of this patent is extended or adjusted under 35 U.S.C. 154(b) by 0 days.

(21) Appl. No.: 12/744,149

(22) PCT Filed: Nov. 21, 2008

(86) PCT No.: PCT/GB2008/003862
§ 371 (c)(1),
(2), (4) Date: Aug. 10, 2010

(87) PCT Pub. No.: WO2009/066056
PCT Pub. Date: May 28, 2009

(65) Prior Publication Data
US 2010/0296025 A1 Nov. 25, 2010

(30) Foreign Application Priority Data

Nov. 23, 2007 (GB) .................................. 0723057.6

(51) Int. Cl.
*G02F 1/13* (2006.01)
*G02F 1/1335* (2006.01)
*F21V 7/22* (2006.01)
*B41M 1/12* (2006.01)

(52) U.S. Cl. ............. 349/3; 349/62; 349/193; 362/97.1; 362/627; 362/620; 362/613; 362/612; 101/129; 385/901

(58) Field of Classification Search ............... 385/901, 385/122, 31, 38; 362/97.1, 97.2, 97.3, 97.4, 362/627, 620, 613, 612; 349/1, 193, 201, 349/3, 62; 101/129
See application file for complete search history.

(56) References Cited

U.S. PATENT DOCUMENTS

| 6,356,389 | B1 | 3/2002 | Nilsen et al. ................. 359/625 |
| 7,288,320 | B2* | 10/2007 | Steenblik et al. ............. 428/403 |
| 2003/0232179 | A1* | 12/2003 | Steenblik et al. ........... 428/195.1 |
| 2004/0028875 | A1* | 2/2004 | Van Rijn et al. ................ 428/98 |
| 2004/0067360 | A1* | 4/2004 | Steenblik et al. ............. 428/402 |
| 2006/0046159 | A1* | 3/2006 | Emslander et al. ............... 430/5 |
| 2006/0227323 | A1 | 10/2006 | Goto ............................ 356/336 |
| 2007/0133229 | A1 | 6/2007 | Tsai ............................. 362/633 |

(Continued)

FOREIGN PATENT DOCUMENTS

EP 0 797 045 9/1997
(Continued)

OTHER PUBLICATIONS

International Search Report, Written Opinion, and International Preliminary Report on Patentability from PCT Application PCT/GB2008/003862.

(Continued)

*Primary Examiner* — Brian Healy
(74) *Attorney, Agent, or Firm* — Harness, Dickey & Pierce, P.L.C.; J. Timothy Keane; Kisuk Lee

(57) ABSTRACT

This invention relates to film layer which is suitable for use in a light guide plate and methods of forming said film layer and light guide plate. The invention also relates to the light guide plate and light guide devices made therefrom. The film and light guide plate are suitable for use in a range of applications, particularly in connection with the backlighting of displays, for example, liquid crystal displays.

21 Claims, 3 Drawing Sheets

U.S. PATENT DOCUMENTS

| | | | |
|---|---|---|---|
| 2007/0159699 A1 | 7/2007 | Wang et al. | 359/599 |
| 2007/0212533 A1 | 9/2007 | Jones et al. | 428/331 |
| 2007/0279773 A1* | 12/2007 | Johnson et al. | 359/831 |
| 2008/0013323 A1 | 1/2008 | Katsumoto et al. | 362/311 |
| 2008/0130018 A1* | 6/2008 | Steenblik et al. | 356/625 |
| 2010/0296025 A1* | 11/2010 | Gourlay | 349/62 |

FOREIGN PATENT DOCUMENTS

| | | |
|---|---|---|
| WO | WO 2005/101070 | 10/2005 |
| WO | WO 2007/138294 | 12/2007 |
| WO | WO 2007/143341 | 12/2007 |

OTHER PUBLICATIONS

UK Search Report, App. GB0723057.6, dated Mar. 10, 2008.

* cited by examiner

LIGHT GUIDES

CROSS REFERENCE TO RELATED APPLICATION

This application is a 371 of PCT International Application No. PCT/GB2008/003862 filed Nov. 21, 2008 (Publication No. WO 2009/066056), which claims priority to GB Patent Application No. 0723057.6, filed Nov. 23, 2007. The disclosures of the above applications are incorporated herein by reference in their entirety.

FIELD OF THE INVENTION

This invention relates to film layer which is suitable for use in a light guide plate and methods of forming said film layer and light guide plate. The invention also relates to the light guide plate and light guide devices made therefrom. The film and light guide plate are suitable for use in a range of applications, particularly in connection with the backlighting of displays, for example, liquid crystal displays.

BACKGROUND OF THE INVENTION

A number of routes and manufacturing processes exist for making light guide layers suitable for use in backlighting applications. Typically, a transparent polymer is injection moulded to form a thin plate with suitable surface features. The surface features disturb the total internal reflection of the light thus allowing light, guided inside the plate, to escape in a controlled manner.

However, there are a number of problems associated with such a technique, not least the expense associated with forming a suitable mould. Typically, the mould is machined or laser cut. Once the mould has been formed, the optical parameters are, effectively, fixed.

Other techniques for forming light guide layers include microstamping or hot embossing polymer sheets. However, the optical quality associated with such polymer sheets is limited by the stamp quality and the associated manufacturing process.

Particularly as backlights become larger, these limitations become more critical. In this regard, there is a continued need for alternative and/or improved light guide layers and structures and methods for formation thereof for use in, inter alia, backlighting applications.

The present invention is partly based on the finding that microstructured optical films, which may be commercially available, may be suitably modified with ink to render them suitable for use in light guide plates and backlighting applications.

SUMMARY OF THE INVENTION

In a first aspect of the present invention, there is provided a light guide plate comprising a first layer of light guiding material in contact with a layer of film, wherein said layer of film has formed on at least one surface:
(i) a series of microstructures, wherein said microstructures allow light inside the light guide plate to escape therefrom; and
(ii) an ink in contact with one or more of said microstructures, wherein said ink reduces the amount of light escaping from the light guide plate at said microstructure.

The first layer of light guiding material may be referred to herein as the guide substrate and the layer of transparent film may be referred to herein as the film layer. The light guiding material and the film layer are light transmissive and preferably transparent to the light generated by a light source which is suitable for use in connection with the light guide plate.

The film layer comprising the ink referred to in the first aspect of the present invention constitutes the second aspect of the present invention.

According to a third aspect of the present invention, there is provided a light guiding device comprising a light source and the light guide plate according to the first aspect of the present invention.

The light source may be mounted upon the film layer. The light source may be encapsulated within the first layer of light transmissive light guiding material to form a composite light guiding device. Alternatively, the light source may not be encapsulated and be coupled to the light guide plate in a conventional manner. For those embodiments wherein the light source is not encapsulated within the first layer of light transmissive light guiding material, this may be referred to as being externally coupled.

According to a fourth aspect of the present invention, a method for forming the film layer as referred to in the second aspect of the present invention comprises depositing ink onto selected areas of a microstructured film.

According to a fifth aspect of the present invention, a method for forming the light guide plate according to the first aspect of the present invention comprises combining the light guide layer and the modified film layer.

The film layer may be modified prior to or before the film layer and guide substrate are combined.

According to a sixth aspect of the present invention, a method of producing a light guide device comprises:
(i) mounting one or more light sources onto a first surface of a layer of film, wherein said layer of film has formed on a second surface a series of microstructures, wherein said microstructures allow light inside the layer of film to escape therefrom, and an ink in contact with one or more of said microstructures, wherein said ink reduces the amount of light escaping from the film at said microstructure and wherein the layer of film and ink have a first refractive index; and
(ii) adding a first layer of light guiding material having a second refractive index that is less than or equal to the first refractive index to the first surface of the film layer so as to encapsulate the one or more light sources upon the first surface and provide a means for guiding light produced by the one or more light sources over the first surface.

According to a seventh aspect of the present invention, there is provided a display device comprising a light guiding device according to the third aspect of the invention. The display device may be a liquid crystal display device and may therefore comprise a liquid crystal cell which may also be referred to as a liquid crystal panel.

There are numerous advantages associated with the various aspects of the present invention including: readily tailored optical performance; low cost printing technology; elimination of the use of expensive tooling and manufacturing processes.

DETAILED DESCRIPTION OF THE INVENTION

The Film Layer

The light transmissive film layer may comprise a substrate element which is typically of the order of 0.1 mm in thickness, for example in the range of about 0.05 mm to about 0.25 mm. The thickness of the microstructure in contact with the substrate element is of the order of about 1 to about 1000 microns, for example about 10 microns to about 40 microns. The refractive index of the film layer is typically greater than 1.5.

The substrate element of the film is typically made from polyester or polycarbonate sheet and the microstructures may be formed in an acrylic polymer. The microstructures may be incorporated or combined with the substrate element in a so-called roll to roll process. In such a process, the microstructures are first mastered onto a metal foil and the inverse of the master pattern is transferred to the acrylic polymer.

Brightness Enhancement Films (BEFs) are suitable microstructured films for use in the present invention. A suitable example of a microstructured film is BEF III Brightness Enhancement Film, which is commercially available from 3M. A particular film from this range is made from polyester substrate of thickness 127 microns and possesses a prism structure, varying in one direction, in acrylic polymer. The prism structure is 28 microns high, has a pitch of 50 microns and the prism angle is 90°. Such a film, suitably modified with ink, may be used in the present invention to produce a backlight with a non-symmetrical beam angle of the scattered light, provided that light is input from one of the edges parallel to the prism direction.

The use of microstructured films, for example BEFs, according to the present invention highlights a particular advantage. In conventional backlight units, the light guide plate and BEF constitute separate elements providing separate functions. In the present invention, the BEF is providing the dual function of enhancing the brightness and guiding the light in the light guide plate.

First Layer of Light Guide Material

Light guide layers which are suitable for use in a backlight unit comprise a transparent flexible plastic polymer layer, typically of about 1 mm in thickness. The light guide material is in contact with the side of the film layer which does not comprise the microstructured surface.

The light guide material may be optically joined to the film layer during manufacture of the light guide plate. The method of combining the light guide layer to the film layer may comprise applying a liquid polymer on the film layer and curing the liquid polymer on the film layer. Methods of curing may make use of one or more techniques including UV, thermal or two-part curing. The method may comprise printing, stencilling or dispensing the liquid polymer. Optically joined indicates the layers are combined in such a way that, optically, these layers are effectively indistinguishable.

The light guide material may be made from a range of suitable light transmissive polymer materials. Preferably, the first layer of light guide material should possess a high optical transmission and possess a refractive index which is equal to or less than the substrate element of the film. Suitable transparent polymers include acrylics, epoxies, urethanes and silicones.

Microstructures

The term microstructures when used in connection with optical films is well known to the skilled person and a wide range of microstructured films are commercially available. A microstructured surface is one which comprises a plurality of repeating three dimensional features, or irregularities, which are proud of the surface and arranged on a scale of about 1 to about 1000 microns, independently, in width, depth and pitch, preferably about 5 to about 50 microns, more preferably about 20 to about 50 microns. Specific types of microstructures, or features, which are suitable for use in the present invention include prisms, pyramids, (micro)lenses, e.g. cylindrical or circular shaped lenses and random diffusing structures. These structures have the ability to change or control the direction of light when it has emerged from a light guide or other lighting device.

Prism based films may have a saw tooth shape structure, varying in one direction, across the entirety of the film with a pitch of about 50 microns, wherein the pitch is the distance between the centre of adjacent microstructures. (Micro) lenses have a regular or random distribution of lenses, which may be of a low focal length, distributed across the film on a scale of about 10 to 100 microns. The diffusing structures may possess a random surface texture which is also on a scale (depth and pitch) of about 10 to 100 microns.

The range of commercially available, well defined microstructures available on film provides a number of design options for the present invention. For example, the use of a prism structure varying in one direction (e.g. BEF III) may be used to generate a non-symmetrical beam profile of the scattered light which is of particular use in liquid crystal device applications when light needs to have a narrow beam angle to increase LCD contrast or to be directed primarily in the direction of the user. The pyramid or microlens structures afford a symmetrical beam profile of scattered light. Random diffuser structures enable Lambertian (wide beam angle) scattering and holographic diffuser structures afford more complex beam forming.

Ink

The ink may be light transmissive. Light transmissive ink has the effect of planarising or flattening the microstructures and facilitates light guiding over the film layer. Light transmissive or transparent ink reduces the amount of light escaping from the film at the microstructure on which it is deposited. Without wishing to be bound by theory, it is believed that light which is being guided by total internal reflection through the light guide plate, encounters a substantially flat surface at the interface between the planarised film layer and air. The substantially flat, planarised surface will retain the total internal reflection and the light will continue to be guided within the light guide plate. The structured surface scatters light out from the light guide plate by breaking the total internal reflection. Reflective ink may also be used on the microstructures as an alternative means for facilitating extraction of light out from the light guide device and controlling the direction in which the light is extracted. Suitable reflective inks for use in the present invention may comprise metal loaded polymers.

Preferably, the refractive indices of the ink and the microstructure should match as closely as possible. For example, the difference in refractive indices should be about 2% or less, more preferably about 1% or less.

The ink, which is typically a polymeric material, may be applied to the microstructured surface of the film to form a thin pattern of features according to any of a number of methods and may be referred to in general terms as an additive printing process. For example, conventional screen printing, incorporates the use of a mesh screen with openings corresponding to the pattern required to be printed. This pattern facilitates the accurate delivery of a volume of ink to the required areas of the microstructures to be planarised. A suitable UV curing ink is Windowtex Gloss which is an acrylic based, transparent UV curing polymer screen printable ink and is commercially available from MacDermid Autotype. Suitable inks for use in the present invention include those which may be UV or solvent cured. Other suitable examples of additive printing methods include stencil printing, ink jet printing, flexographic printing and other known lithographic techniques.

The ink may be applied in varying amounts and shapes. This may depend on how close to the light source the ink is being deposited. The intensity of the light becomes less as the distance from the light source increases. To take account of this, larger sized light transmissive ink dots which are more closely spaced may be deposited closer to the position of the light source resulting in small areas of unplanarised microstructure, whereas smaller sized light transmissive ink dots which are more widely spaced may be deposited as the distance from the light source increases, resulting in larger areas of unplanarised microstructure.

Light Source

The light source can be any of those known to those skilled in the art, including those which are suitable for use in backlighting. Such light sources include one or more LEDs, cold cathode fluorescent lamps, laser diodes, organic light emitting diode sources, and other electroluminescent devices. The light may be non-directional.

The LEDs can be any of the designs known to those skilled in the art, including edge-emitting, side emitting, top emitting or bare die LEDs.

Light Guide Devices

Light guide devices are employed for a range of functions including illumination, backlighting, signage and display purposes. Typically, the light guide devices are constructed from an injection moulded or machined transparent plastic component, where a light source, such as a fluorescent lamp or a plurality of light emitting diodes (LEDs), is integrated by means of mechanical attachment at the edge of the transparent plastic component. Examples of such devices are described in WO 2005/101070, the contents of which are incorporated herein in their entirety by reference.

Common to all of these devices is the fact that light from the light source is guided through a transparent guide, typically made of plastic, by total internal reflection. For edge-lit backlighting applications, light is emitted in a substantially perpendicular direction to that of the direction of propagation of the light within the transparent guide. This may be achieved through the light being directed so as to interact with scattering structures or films located within, or on the surface of, the transparent guide.

The integration of fluorescent lamps or LEDs to the edge of the transparent light guide is not a straightforward process and thus significantly increases the complexity of the production process for these devices. Achieving a good coupling is essential to the optical performance of the device. In addition, edge coupling of the light sources renders these components susceptible to mechanical damage during both the production process and the normal use of the device.

The coupling of the LEDS to the light guide layer may be achieved according to a range of techniques. This may be achieved by a butt coupling process where the LEDs are attached to the end of the light guides by UV curing with a high refractive index photonic adhesive that acts to reduce reflections from the ends of the light guide layer. The light guide layer may be hot cleaved or polished to provide a suitable optical surface at the end of the light guide layer which facilitates good coupling of light from the light source into the light guide layer.

In addition to the conventional techniques of incorporating light sources with light guide devices, the present inventors have also developed a technique whereby the light source may be encapsulated within the light guide layer. There are a number of advantages associated with such an arrangement. These advantages include enhanced mechanical protection for the light source, a simplified manufacturing process and enhanced optical coupling of the light within the device.

In accordance with such an arrangement, the light source will typically be in contact with the non-microstructured surface of the modified film layer. Preferably, the film layer will have a first refractive index which is greater than or equal to the refractive index of the first layer of light guide material. The light guide material is arranged to encapsulate the one or more light sources upon the film layer such that the film layer and the first layer of light guide material, which is referred to herein as the light guide plate, form a composite structure for guiding light produced by the one or more light sources over the film layer.

Such an arrangement provides a light guiding device that exhibits enhanced mechanical protection for the light sources. Furthermore, since there is no air gap between the output of the light sources and the light guide layer such an embodiment is simple to produce and exhibits enhanced optical coupling of the light within the device.

A suitable method of adding the light guide layer to the film layer comprises applying a liquid polymer to the film layer and curing the liquid polymer on the film layer. The liquid polymer may be applied by printing, stencilling or dispensing the liquid polymer.

Uses of the Light Guide Devices

The light guide device according to the present invention may be employed for a range of functions including illumination, backlighting, signage and display purposes.

Liquid crystal devices are well known in the art. A liquid crystal display device operating in a transmissive mode typically comprises a liquid crystal cell, which may also be referred to as a liquid crystal panel, a backlight unit incorporating a light guide device, and one or more polarisers. Liquid crystal cells are also well known devices. In general, liquid crystal cells typically comprise two transparent substrates between which is disposed a layer of liquid crystal material. A liquid crystal display cell may comprise two transparent plates which may be coated on their internal faces respectively with transparent conducting electrodes. An alignment layer may be introduced onto the internal faces of the cell in order that the molecules making up the liquid crystalline material line up in a preferred direction. The transparent plates are separated by a spacer to a suitable distance, for example about 2 microns. The liquid crystal material is introduced between the transparent plates by filling the space in between them by flow filling. Polarisers may be arranged in front of and behind the cell. The backlight unit may be positioned behind the liquid crystal cell using conventional means. In operation, a liquid crystal cell, operating in a transmissive mode, modulates the light from a light source such as a backlight unit which may comprise a light guide device.

BRIEF DESCRIPTION OF THE DRAWINGS

Embodiments of the invention will now be described, by way of example only and without limitation, with reference to the accompanying drawings and the following Examples, in which:

FIG. 1a illustrates a conventional microstructured film (1), for example a conventional brightness enhancement film (BEF), which is typically used in a backlighting unit to enhance the lighting performance by changing the direction of the emitted light. The microstructured film (1) is formed from a substrate element (2), for example made from polyester or polycarbonate sheet, and is of the order of about 0.1 mm in thickness. The microstructure (3) is formed from a polymer such as an acrylic polymer. In the particular embodiment illustrated, the microstructure (3) is in the form of prisms which possess both a thickness and repeating pattern at a pitch of about 0.05 mm. The pitch as shown in the microstructure (3) of FIG. 1 is the distance between the peaks.

FIG. 1b illustrates the device of FIG. 1a suitably modified according to the present invention. Light transmissive ink (4) has been deposited onto selected areas of the microstructures (3) in order to planarise or flatten the microstructure. The effect is to "turn off" the microstructure in question and reduce the amount of light exiting the particular microstructure. The ink may be applied via a screen printing technique and cured with UV light. Reflective ink may also be deposited depending on which direction it is required to extract the light.

FIG. 1c illustrates the effect of modifying the microstructured surface as shown in FIG. 1b on light (5) from an externally coupled light source (6). By selectively planarising the microstructured surface with light transmissive ink, as indicated at (7), the light is guided across the microstructured film. The light is scattered in those areas, as indicated by (8a and 8b) where the microstructure has not been modified with the light transmissive ink. The optional presence of a light guide layer (10) is also shown. Also shown is the optional presence of a reflective element (15), should it be required to redirect light indicated by (8a) through the top of the device and in the general direction indicated by (8b). If desired, the amount of light exiting the device indicated at 8a can be reduced by depositing reflective ink on the microstructure at the point at which the light indicated by 8a exits the microstructure. This will also have the effect of increasing the amount of light exiting the device in the general direction indicated by (8b).

FIG. 2 illustrates an embodiment of the invention wherein the light source is distributed on the modified microstructured film and encapsulated in a light guide layer (10). In FIG. 2, the light source, in this case one or more LEDs (9), is distributed on the non-microstructured side (11) of the microstructured film and is encapsulated in the light guide layer (10). At the perimeter interface between the substrate element (2) and the light guide layer (10), a cavity layer structure (not shown) may be incorporated in order to form a suitable cavity in which the LEDs may be embedded.

The refractive index of the microstructured film (1) may have a refractive index given by $n_2$ and the light guide layer (10) may have a refractive index given by $n_4$. The refractive indices of the microstructured film and the light guide layer (10) are such that they may satisfy the inequality $n_2$ being greater than or equal to $n_4$. As a result, light generated by the light source is initially coupled into the transparent light layer so as to propagate in a direction substantially parallel to a plane defined by the microstructured film. With the refractive index of the microstructured film (1) selected to be equal or higher than that of the light guide layer (10), the generated light is guided within both the microstructured film and the light guide layer due to the effects of total internal reflection. Therefore the microstructured film (1) and the transparent light guide layer (10), collectively referred to as the light guide plate, form a composite structure that acts as the guiding media for the light generated by the encapsulated LED.

Figure 1A:
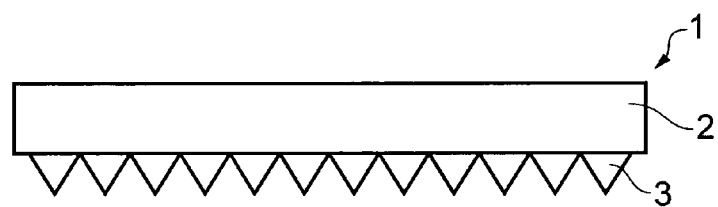
FIG. 1a illustrates a conventional microstructured film.
Figure 1B:
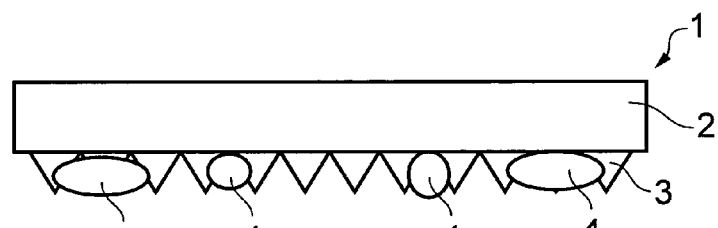
FIG. 1b illustrates the conventional microstructured film of FIG. 1a following modification with ink according to the present invention.
Figure 1C:
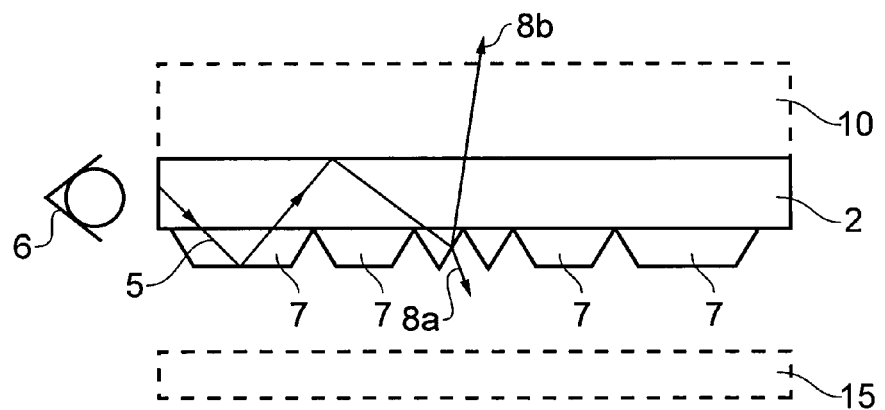
FIG. 1c illustrates the effect of the modified structure according to FIG. 1b on the transmission of light.
Figure 2:
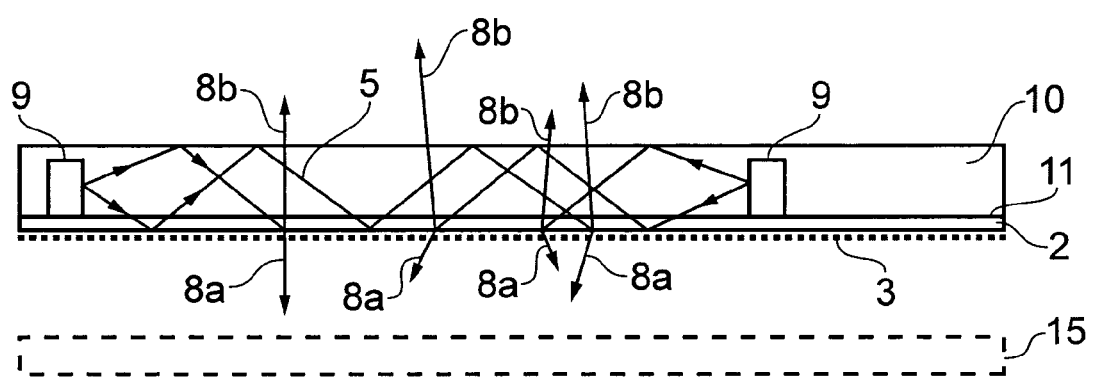
FIG. 2 illustrates a light guide device embodiment of the invention wherein a light source is distributed on the modified microstructured film and encapsulated in the light guide layer.

Similarly, as described in connection with FIG. 2, the optional presence of a reflective element (15) is shown should it be required to redirect light indicated by (8a) through the top of the device and in the general direction indicated by (8b). If desired, the amount of light exiting the device indicated at 8a can be reduced by depositing reflective ink on the microstructure at the point at which the light indicated by 8a exits the microstructure. This will also have the effect of increasing the amount of light exiting the device in the general direction indicated by (8b).

Figure 3:
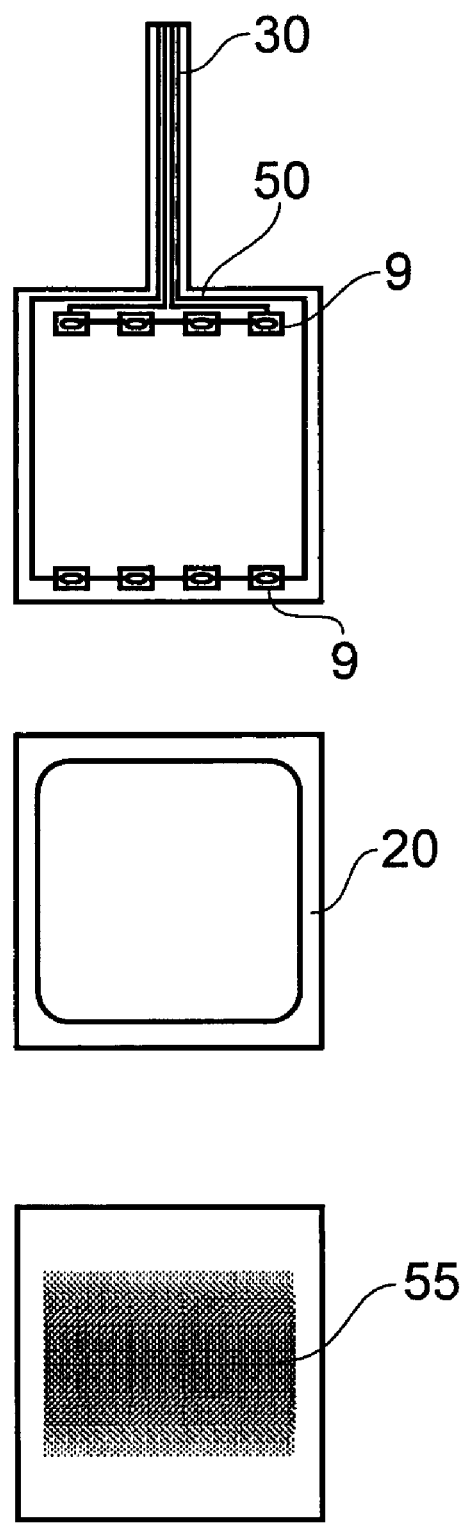
FIG. 3 illustrates the construction of a light guide device according to the present invention comprising encapsulated LEDs.

FIG. 3 illustrates a light guide device according to the present invention comprising encapsulated LEDs. The device is shown in plan view, viewed from above the substrate element (2) as indicated in FIG. 2. A cavity layer (20) is fixed to the flat side of the microstructured film in order to provide a location for the LEDs to be embedded. The arrangement of the LEDs (9) which are mounted on to conducting ink tracks (50) is illustrated. An electrical connection tail is shown more generally at (30). In the embodiment shown, the LEDs are configured in two banks of four in a series chain. The scatter print (55), which is printed on the microstructured surface of the film, in order to modify it and provide an appropriate scattering feature for light guiding and uniform light output, is also shown.

EXAMPLES

Example 1

A light guide device was made as follows and with reference to FIG. 3 described above. 3M BEF III (Matte) was obtained from 3M and used as the film layer. Silver flake loaded solvent based polymer ink, which is a conducting ink, was screen printed onto the top side (non-microstructured side) of the BEF substrate. Windotex Gloss, an acrylic based, transparent UV curing polymer screen printable ink which is commercially available from MacDermid Autotype was printed on the reverse side of the substrate in a pattern to modify the BEF microstructure and provide the light scattering feature for uniform light output. In this example, the pattern was a series of small lines which were pitched across the surface at the 1000 micron scale and sized at the 500 to 1000 micron scale near the LEDs and sized at the 100 to 500 micron scale towards the middle of the microstructured film, and further away from the LEDs, resulting in minimal planarising of the microstructure. This arrangement resulted in a uniform extraction of light across the device. Conducting epoxy (silver particle loaded epoxy) was used to mount the LEDs (Stanley TW1145LS-TR) onto the conducting ink tracks. A cavity layer was laminated onto the film layer to provide a region for depositing the light guide layer and encapsulating the LEDs. The UV curing acrylic based transparent polymer light-guide material Dymax 4-20688, which is commercially available from Dymax, was deposited into the cavity, so encapsulating the LEDs in a composite light-guiding structure. As described above, light from the LEDs is guided through both the added light-guide layer and the film layer by total internal reflection due to the material/air interface where light then interacts with the selective scattering feature, the total internal reflection is disturbed and light scatters out with a defined beam profile.

The modified film was shown to be a suitable substrate for the LEDs and was suitable for increasing the amount of light scattered into a high luminance narrow beam angle of good uniformity which is preferably required for backlighting applications used in connection with high contrast liquid crystal devices. Microstructured films are not conventionally used in such a manner.

Example 2

A number of experiments were undertaken to test the use of specular reflective ink in combination with the microstructured film used in Example 1. A pattern of mirrored prisms were deposited on the microstructures. By using a commercially available chrome, air drying ink, the acrylic microstructure/ink interface was made reflective from the acrylic side. The reflective ink was printed at 100 Dots Per Inch (DPI).

The invention claimed is:

1. A light guide plate comprising:
   a first layer of light guiding material in contact with a layer of film, wherein said layer of film has formed on at least one surface of:
   i. a series of microstructures, wherein said microstructures allow light inside the light guide plate to escape therefrom; and
   ii. an ink in contact with said microstructures, wherein said ink reduces the amount of light escaping from the light guide plate at said microstructures,
   wherein the layer of film has a thickness of about 0.05 mm to about 0.25 mm.

2. The light guide plate according to claim 1, wherein the surface of the microstructures comprises a plurality of three dimensional features which are proud of the surface and each microstructure possesses a width, depth and pitch of, selected independently of each other, about 1 to about 1000 microns.

3. The light guide plate according to claim 2, wherein the width, depth and pitch are, independently of each other, about 5 to about 50 microns.

4. The light guide plate according to claim 1, wherein the microstructures comprise one or more of prisms, pyramids, lenses, and random diffusing structures.

5. The light guide plate according to claim 1, wherein the layer of film is a brightness enhancement film.

6. A light guide plate comprising:
   a first layer of light guiding material in contact with a layer of film, wherein said layer of film has formed on at least one surface of:
   i. a series of microstructures, wherein said microstructures allow light inside the light guide plate to escape therefrom; and
   ii. an ink in contact with said microstructures, wherein said ink reduces the amount of light escaping from the light guide plate at said microstructures,
   wherein the thickness of the first layer of light guiding material is about 1 mm.

7. The light guide plate according to claim 1, wherein the first layer of light guide material possesses a refractive index which is equal to or less than the refractive index of the film layer.

8. The light guide plate according to claim 1, wherein the ink is distributed non-uniformly across the microstructures.

9. A light guide device comprising a light guide plate according to claim 1 and one or more light sources.

10. The light guide device according to claim 9, wherein the one or more light sources are coupled externally to the light guide plate.

11. The light guide device according to claim 9, wherein the one or more light sources are encapsulated in the first layer of light guiding material.

12. The light guide device according to claim 11, wherein the film layer and the first layer of light guiding material form a composite structure for guiding light, produced by the one or more light sources, over the layer of film.

13. The light guide device according to claim 9, wherein the one or more light sources are selected from LEDs, cold cathode fluorescent lamps, laser diodes, organic light emitting diode sources, and other electroluminescent devices.

14. The light guide device according to claim 13, wherein the one or more light sources are LEDs.

15. The light guide device according to claim 9, wherein the concentration of ink decreases as the distance from the light source increases.

16. A film layer comprising a microstructured surface and ink in contact with the surface of said microstructures suitable for use in the light guide plate as claimed in claim 1.

17. A method for forming a film layer according to claim 16, comprising depositing ink onto selected areas of the microstructures.

18. The method according to claim 17, wherein an additive printing method is used.

19. The method according to claim 18, wherein the additive printing method is a screen printing method.

20. A display device comprising the light guide device according to claim 9.

21. The display device according to claim 20, wherein the display device comprises a liquid crystal cell.

* * * * *